US012067930B2

(12) United States Patent
Li

(10) Patent No.: US 12,067,930 B2
(45) Date of Patent: Aug. 20, 2024

(54) LIGHT-EMITTING PANEL

(71) Applicant: Shenzhen China Star Optoelectronics Semiconductor Display Technology Co., Ltd., Shenzhen (CN)

(72) Inventor: Yanchen Li, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/618,512

(22) PCT Filed: Aug. 25, 2021

(86) PCT No.: PCT/CN2021/114591

§ 371 (c)(1),
(2) Date: Dec. 13, 2021

(87) PCT Pub. No.: WO2023/019618

PCT Pub. Date: Feb. 23, 2023

(65) Prior Publication Data

US 2024/0038140 A1 Feb. 1, 2024

(30) Foreign Application Priority Data

Aug. 19, 2021 (CN) ......................... 202110955201.7

(51) Int. Cl.
*G09G 3/32* (2016.01)

(52) U.S. Cl.
CPC ....... *G09G 3/32* (2013.01); *G09G 2320/0233* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 2017/0249899 | A1 | 8/2017 | Xiang et al. | |
| 2020/0286426 | A1* | 9/2020 | Li | G09G 3/3233 |
| 2021/0013289 | A1* | 1/2021 | Li | G09G 3/3233 |

FOREIGN PATENT DOCUMENTS

| | | | |
|---|---|---|---|
| CN | 104050915 | A | 9/2014 |
| CN | 205566743 | U | 9/2016 |
| CN | 109686312 | A | 4/2019 |
| CN | 110310976 | A | 10/2019 |
| CN | 112201165 | A | 1/2021 |
| CN | 112767880 | A | 5/2021 |
| CN | 213583795 | U | 6/2021 |
| CN | 113450707 | A | 9/2021 |
| JP | 2009098539 | A | 5/2009 |

* cited by examiner

*Primary Examiner* — Nicholas J Lee
(74) *Attorney, Agent, or Firm* — Nathan & Associates; Menachem Nathan

(57) ABSTRACT

Disclosed is a light-emitting panel. The light-emitting panel includes a first power line; a second power line, the second power line and the first power line are spaced apart; and a plurality of light-emitting units arranged at intervals. The plurality of light-emitting units is connected to a plurality of light-emitting circuits in series in one-to-one correspondence, and the light-emitting circuit includes the first power line and the second power line. A compensation resistor is further connected to the light-emitting circuit in series.

16 Claims, 5 Drawing Sheets

LIGHT-EMITTING PANEL

FIELD OF THE INVENTION

The present application relates to a display technology field, and more particularly to a light-emitting panel.

BACKGROUND OF THE INVENTION

Light-emitting diodes are one of the most popular display technologies at present, and possess many advantages such as high brightness, high contrast and long service life. Light-emitting diodes cannot only be used as direct backlights to achieve high dynamic lighting rendering functions, but also used as displays to achieve many functions, such as direct display, transparent display and flexible display.

In existing products, there are resistances on the VDD line and VSS line that drive the light-emitting diodes for emitting light. The resistance divider causes the loaded voltages at two ends of the light-emitting diodes at different positions and the currents flowing through the light-emitting diodes to be different, resulting in an IR drop problem, which leads to uneven brightness of the light-emitting diodes on the light-emitting panel.

SUMMARY OF THE INVENTION

The present application provides a light-emitting panel, which can improve the uniformity of the light-emitting brightness of the light-emitting panel.

First, the present application provides a light-emitting panel, including:

- a first power line;
- a second power line, the second power line and the first power line are spaced apart; and
- a plurality of light-emitting units, the plurality of light-emitting units are connected to a plurality of light-emitting circuits in series in one-to-one correspondence, and the light-emitting circuit including the first power line and the second power line, wherein a compensation resistor is connected to the light-emitting circuit in series.

In the light-emitting panel provided by the present application, a plurality of first signal output terminals are arranged on the first power line, and a plurality of second signal output terminals are arranged on the second power line;

- the plurality of first signal output terminals and the plurality of second signal output terminals are in one-to-one correspondence to form the plurality of light-emitting circuits, and the compensation resistor is connected between the corresponding first signal output terminal and the corresponding second signal output terminal in series.

In the light-emitting panel provided by the present application, the plurality of the first signal output terminals are equally spaced, and the plurality of the second signal output terminals are equally spaced, and a distance between adjacent first signal output terminals is equal to a distance between adjacent second signal output terminals.

In the light-emitting panel provided by the present application, a first signal input terminal is arranged on the first power line, and a second signal input terminal is arranged on the second power line, and the first signal input terminal and the second signal input terminal are located on a same side.

In the light-emitting panel provided by the present application, currents flowing through the light-emitting circuits are equal, and voltages at two ends of light-emitting devices in the light-emitting circuits are equal.

In the light-emitting panel provided by the present application, a voltage Vxx' at the two ends of the xth light-emitting circuit is equal to (r+rx)*i, wherein rx is a resistance value of the compensation resistor connected in the xth light-emitting circuit in series, and r is a resistance value of an equivalent resistance of the light-emitting device in each of the light-emitting units, and i is a current value flowing through each of the light-emitting circuits, and x is a positive integer.

In the light-emitting panel provided by the present application, the resistance value rx of the compensation resistor connected in the xth light-emitting circuit in series is equal to (x−1)*x*R, wherein R is a resistance value of a line resistance of the first power line or the second power line in each of the light-emitting units.

In the light-emitting panel provided by the present application, an equation for an increase in an invalid power consumption caused by the line resistance of the first power line, the line resistance of the second power line and the compensation resistor is Pinvalid/Pvalid=(n−1)*n*R/r, wherein n is a number of the plurality of light-emitting units arranged at intervals along a first direction.

In the light-emitting panel provided by the present application, the light-emitting panel includes a substrate, and a first metal layer and a second metal layer disposed on the substrate;

- wherein the first metal layer includes the compensation resistor, or the second metal layer includes the compensation resistor, or the first metal layer and the second metal layer are arranged to be connected in series to form the compensation resistor, or the first metal layer and the second metal layer are arranged to be connected in parallel to form the compensation resistor.

In the light-emitting panel provided by the present application, the compensation resistor includes a plurality of electrically connected metal block units, and a resistance value R0 of each of the metal block units is equal to Rs*L/W, wherein R0 is the resistance value of the metal block unit, and Rs is a square resistance of a corresponding metal layer, and L is a length of the metal block unit, and W is a width of the metal block unit.

Second, the present application provides a light-emitting panel, including:

- a first power line;
- a second power line, the second power line and the first power line are spaced apart; and
- a plurality of light-emitting units, the plurality of light-emitting units are connected to a plurality of light-emitting circuits in series in one-to-one correspondence, and the light-emitting circuit includes the first power line and the second power line, wherein a compensation resistor is connected to the light-emitting circuit in series;
- a plurality of first signal output terminals are arranged on the first power line, and a plurality of second signal output terminals are arranged on the second power line;
- the plurality of first signal output terminals and the plurality of second signal output terminals are in one-to-one correspondence to form the plurality of light-emitting circuits, and the compensation resistor is connected between the corresponding first signal output terminal and the corresponding second signal output terminal in series;

a first signal input terminal is arranged on the first power line, and a second signal input terminal is arranged on the second power line, and the first signal input terminal and the second signal input terminal are located on a same side.

In the light-emitting panel provided by the present application, the plurality of the first signal output terminals are equally spaced, and the plurality of the second signal output terminals are equally spaced, and a distance between adjacent first signal output terminals is equal to a distance between adjacent second signal output terminals.

In the light-emitting panel provided by the present application, currents flowing through the light-emitting circuits are equal, and voltages at two ends of light-emitting devices in the light-emitting circuits are equal.

In the light-emitting panel provided by the present application, a voltage Vxx' at the two ends of the xth light-emitting circuit is equal to (r+rx)*i, wherein rx is a resistance value of the compensation resistor connected in the xth light-emitting circuit in series, and r is a resistance value of an equivalent resistance of the light-emitting device in each of the light-emitting units, and i is a current value flowing through each of the light-emitting circuits, and x is a positive integer.

In the light-emitting panel provided by the present application, the resistance value rx of the compensation resistor connected in the xth light-emitting circuit in series is equal to (x−1)*x*R, wherein R is a resistance value of a line resistance of the first power line or the second power line in each of the light-emitting units.

In the light-emitting panel provided by the present application, an equation for an increase in an invalid power consumption caused by the line resistance of the first power line, the line resistance of the second power line and the compensation resistor is Pinvalid/Pvalid=(n−1)*n*R/r, wherein n is a number of the plurality of light-emitting units arranged at intervals along a first direction.

In the light-emitting panel provided by the present application, the light-emitting panel includes a substrate, and a first metal layer and a second metal layer disposed on the substrate;

wherein the first metal layer includes the compensation resistor, or the second metal layer includes the compensation resistor, or the first metal layer and the second metal layer are arranged to be connected in series to form the compensation resistor, or the first metal layer and the second metal layer are arranged to be connected in parallel to form the compensation resistor.

In the light-emitting panel provided by the present application, the compensation resistor includes a plurality of electrically connected metal block units, and a resistance value R0 of each of the metal block units is equal to Rs*L/W, wherein R0 is the resistance value of the metal block unit, and Rs is a square resistance of a corresponding metal layer, and L is a length of the metal block unit, and W is a width of the metal block unit.

In the light-emitting panel of the present application, the plurality of light-emitting units are connected to a plurality of light-emitting circuits in series in one-to-one correspondence, and the light-emitting circuit including the first power line and the second power line. By connecting a compensation resistor to the light-emitting circuit in series, the resistances of the light-emitting circuits tends to be equal, thus the uniformity of the light-emitting brightness of the light-emitting panel can be improved.

BRIEF DESCRIPTION OF THE DRAWINGS

In order to more clearly illustrate the embodiments of the present application, the following figures will be described in the embodiments are briefly introduced. It is obvious that the drawings are only some embodiments of the present application, those of ordinary skill in this field can obtain other figures according to these figures without paying the premise.

DETAILED DESCRIPTION OF PREFERRED EMBODIMENTS

Embodiments of the present application are described in detail with the technical matters, structural features, achieved objects, and effects with reference to the accompanying drawings as follows. It is clear that the described embodiments are part of embodiments of the present application, but not all embodiments. Based on the embodiments of the present application, all other embodiments to those of skilled in the premise of no creative efforts obtained, should be considered within the scope of protection of the present application.

It should be understood that the specific embodiments described herein are merely for illustrating and explaining the present application and are not intended to limit the present application. Besides, the terminologies "first" and "second" in the claims and specification of the present application are used for distinguishing different objects but not for describing the specific sequence.

The embodiment of the present application provides a light-emitting panel, which will be described in detail below. It should be noted that the order of description in the following embodiments is not meant to limit the preferred order of the embodiments. The light-emitting panel provided by the embodiment of the present application may be a display panel or a backlight panel.

Figure 1:
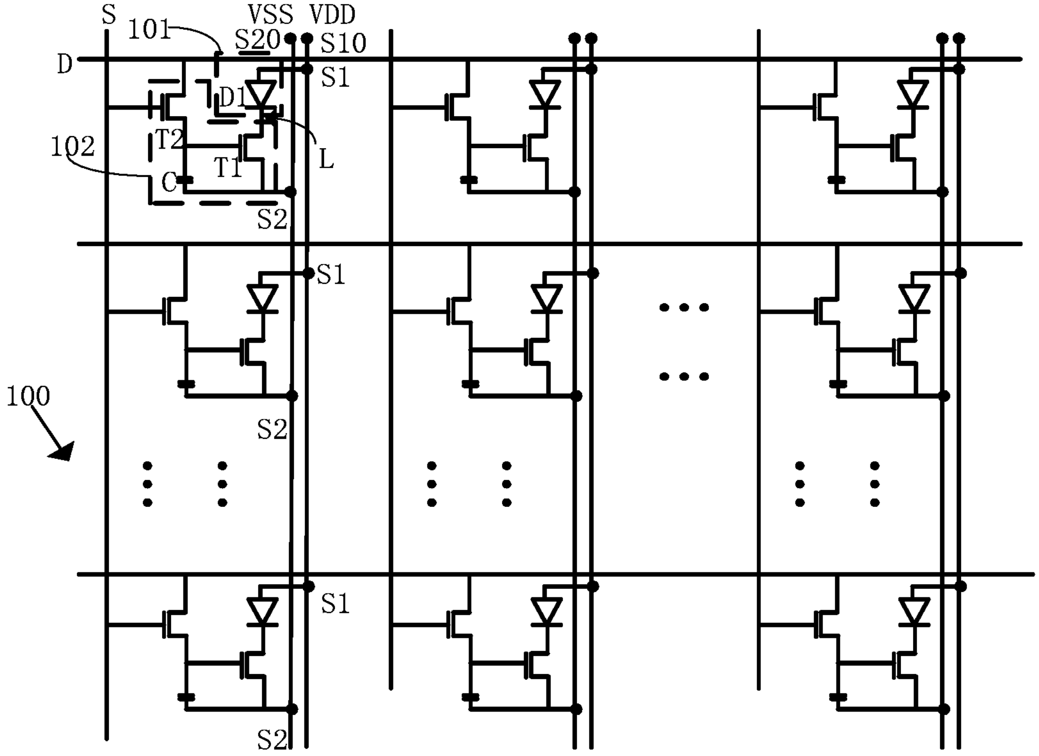
FIG. 1 is a structure diagram of a light-emitting panel provided by an embodiment of the present application.

Please refer to FIG. 1. FIG. 1 is a structure diagram of a light-emitting panel provided by an embodiment of the present application. The light-emitting panel 100 provided by the embodiment of the present application includes a plurality of first power lines VDD, a plurality of second power lines VSS and a plurality of light-emitting units 101. The plurality of light-emitting units 101 are arranged in an array. Each column of light-emitting units 101 is correspondingly connected to a first power line VDD and a second power line VSS. The first power line VDD and the second power line VSS corresponding to each column of light-emitting units 101 are spaced apart. Each first power line VDD and each second power line VSS extend along a first direction.

Among the plurality of light-emitting units 101 arranged at intervals along the first direction, the plurality of light-emitting units 101 are connected to a plurality of light-emitting circuits L in series, and the light-emitting circuit includes the first power line VDD and the second power line VSS. Namely, each light-emitting circuit L is connected with one light-emitting unit 101 in series, and the current driving the light-emitting unit 101 to emit light flows from the first power line VDD into the light-emitting unit 101 and flows out of the light-emitting unit 101 from the second power line VSS.

The light-emitting unit 101 may include at least one light-emitting device D1. For instance, the light-emitting unit 101 can be one light-emitting device D1. For another instance, the light-emitting unit 101 may be a plurality of light-emitting devices D1, and the plurality of light-emitting devices D1 may be connected in series, in parallel or in a combination of series and parallel. In some embodiments, the light-emitting device D1 may be a Micro-LED (micro light-emitting diode). In other embodiments, the light-emitting device D1 may be a Mini-LED (sub-millimeter light-emitting diode).

Furthermore, the light-emitting panel 100 further includes a plurality of driving circuits 102. The plurality of driving circuits 102 correspond to the plurality of light-emitting units 101 one-to-one. The driving circuit 102 is employed to drive the light-emitting unit 101 to emit light. The driving circuit 102 includes a driving transistor T1, a switching transistor T2 and a capacitor C. The source electrode of the switching transistor T2 is electrically connected to a data line D, the drain electrode of the switching transistor T2 is electrically connected to the gate electrode of the driving transistor T1 and one end of the capacitor C, and the gate electrode of the switching transistor T2 is electrically connected to a scan line S. The source electrode of the driving transistor T1 is electrically connected to one end of the light-emitting device D1, and the drain electrode of the driving transistor T1 is electrically connected to the second power line VSS. The other end of the capacitor C is electrically connected to the second power line VSS. The other end of the light-emitting device D1 is electrically connected to the first power line VDD.

Specifically, the scan line S controls on and off of the switching transistor T2, and the scan line S scans column by column. When the switching transistor T2 is turned on, the data line D charges the capacitor C. After the switching transistor T2 is turned off, the capacitor C is fully charged and remains at a fixed potential. The potential maintained by the capacitor C controls on and off of the driving transistor T1. When the capacitor C is at a high potential, the driving transistor T1 is turned on, and the current flows from the first power line VDD into the light-emitting device D1 and the driving transistor T1, and finally flows out of the second power line VSS. Then, the continuous light emission of the light-emitting device D1 is realized. When the capacitor C is at a low potential, the driving transistor T1 is turned off, and the light-emitting device D1 remains in the off state.

Specifically, the driving circuit 102 in the embodiment of the present application may also be other circuits, and the driving circuit shown in FIG. 1 is only an implementation of the present application. For instance, the driving circuit 102 in the embodiment of the present application may be a circuit with a function of compensating a threshold voltage of the driving transistor T1.

A first signal input terminal S10 is arranged on the first power line VDD. A second signal input terminal S20 is arranged on the second power line VSS. The first signal input terminal S10 and the second signal input terminal S20 are located on a same side. A plurality of first signal output terminals S1 are arranged on the first power line VDD. A plurality of second signal output terminals S2 are arranged on the second power line VSS. The plurality of first signal output terminals S1 and the plurality of second signal output terminals S2 are in one-to-one correspondence to form the plurality of light-emitting circuits L. The first signal input terminal S10 and the second signal input terminal S20 are both external signal input terminals. For instance, a first signal outputted by the power supply module is first transmitted to the first signal input terminal S10, and then transmitted to each of the first signal output terminals S1 through the first signal input terminal S10; a second signal outputted by the power supply module is first transmitted to the second signal input terminal S20, and then transmitted to each of the second signal output terminals S2 through the second signal input terminal S20.

Specifically, in the embodiment of the present application, the light-emitting circuit L farthest from the first signal input terminal S10 or the second signal input terminal S20 is the first light-emitting circuit L, and so on, the light-emitting circuit L closest to the first signal input terminal S10 or the second signal input terminal S20 is the last light-emitting circuit L. The light-emitting unit 101 farthest from the first signal input terminal S10 or the second signal input terminal S20 is the first light-emitting unit 101, and so on, the light-emitting unit 101 closest to the first signal input terminal S10 or the second signal input terminal S20 is the last light-emitting unit 101.

In some embodiment, the plurality of first signal output terminals S1 are arranged at equal intervals; namely, on the first power line VDD, the distances between adjacent first signal output terminals S1 are equal. The plurality of second signal output terminals S2 are arranged at equal intervals; namely, on the second power line VSS, the distances between adjacent second signal output terminals S2 are equal. The distance between adjacent first signal output terminals S1 is equal to the distance between adjacent second signal output terminals S2. The light-emitting panel 100 provided by the embodiment of the present application can ensure the line resistance of the corresponding first power line VDD and the line resistance of the corresponding second power line VSS are equal in each light-emitting unit 101 through the aforesaid configuration, which is beneficial to improve the uniformity of the light-emitting brightness of the light-emitting panel 100.

Figure 2:
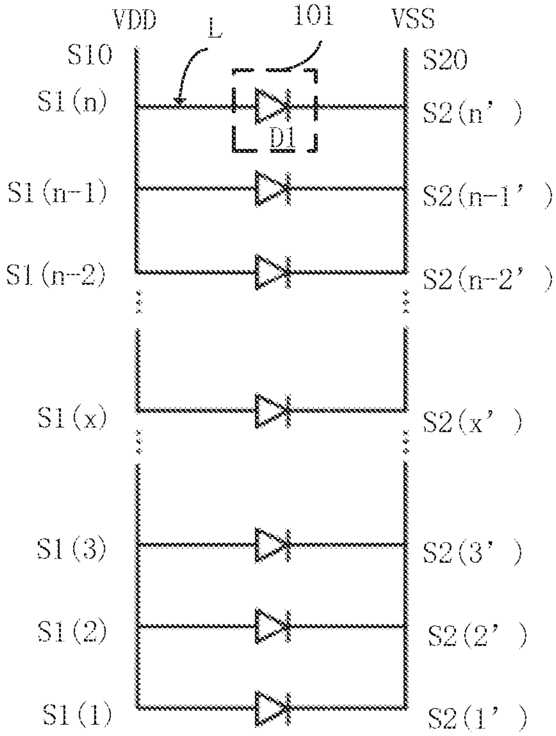
FIG. 2 is a schematic diagram of an equivalent circuit of a plurality of light-emitting units arranged at intervals along a first direction in the light-emitting panel shown in FIG. 1 under an ideal condition.
Figure 3:
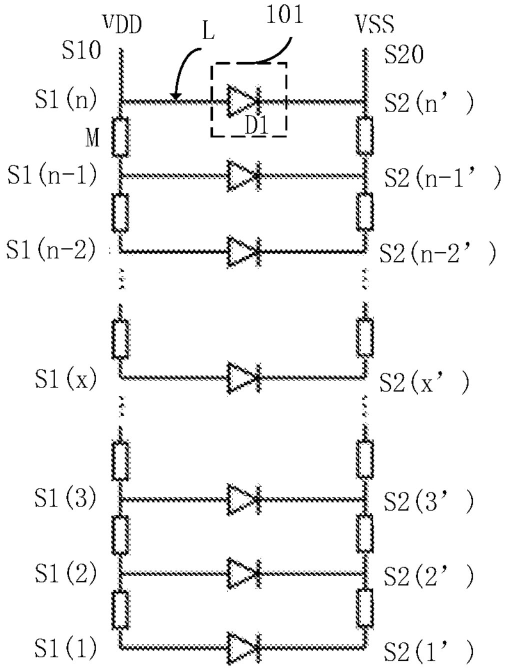
FIG. 3 is a schematic diagram of an equivalent circuit of a plurality of light-emitting units arranged at intervals along a first direction in the light-emitting panel shown in FIG. 1 under an actual condition.

Please refer to FIG. 2 and FIG. 3. FIG. 2 is a schematic diagram of an equivalent circuit of a plurality of light-emitting units arranged at intervals along a first direction in the light-emitting panel shown in FIG. 1 under an ideal condition. FIG. 3 is a schematic diagram of an equivalent circuit of a plurality of light-emitting units arranged at intervals along a first direction in the light-emitting panel shown in FIG. 1 under an actual condition. As shown in FIG. 1, FIG. 2 and FIG. 3, the plurality of light-emitting units 101 arranged at intervals along the first direction share one first power line VDD and one second power line VSS, and the current driving the light-emitting unit 101 to emit light flows from the first power line VDD into the light-emitting unit 101 and flows out of the light-emitting unit 101 from the second power line VSS. When the plurality of light-emitting units 101 in the first direction are in a light-emitting state, the switching transistor T2 is in the off state and the driving transistor T1 is in the on state, and one column of the light-emitting units 101 can be equivalent to a plurality of light-emitting units 101 connected in parallel with each other. One end of the parallel circuit is powered by the first power line VDD, and the other end of the parallel circuit is powered by the second power line VSS.

As shown in FIG. 2, ideally, the resistance of the first power line VDD and the resistance of the second power line VSS are both zero. One column of the light-emitting units 101 can be equivalent to a plurality of light-emitting units 101 connected in parallel with each other. The voltages at the two ends of all light-emitting units 101 are equal, and the light-emitting unit 101 is equivalent to a fixed resistance device. Thus, the entire column of light-emitting units 101 can be equivalent to n fixed resistance devices in parallel, and the following relationship can be obtained:

the first light-emitting unit, R1=r, i1=i, I1=i;

the second light-emitting unit, R2=r/2, i2=i, I2=i*2=2i;

the xth light-emitting unit, Rx=r/x, ix=i, Ix=i*x=xi;

the nth light-emitting unit, Rn=r/n, in=i, In=i*n=ni;

V11'=V22'=V33'=mitting unit, Rn=r/n, in=i, In=i*n=ni;2i i1=i2=i3= . . . =ix= . . . =i(n−2)=i(n−1)=in;

wherein the light-emitting unit 101 is a constant current device. In order to make the light-emitting unit 101 emit light with a fixed brightness, the current value flowing through the light-emitting unit 101 is required to be fixed to i; that is, i is the current value flowing through each light-emitting circuit L. r is the resistance value of the fixed resistance device equivalent to each light-emitting unit 101. ix is the current value flowing through the xth light-emitting unit, and lx is the sum of the current values flowing through the first to the xth light-emitting units, and Vxx' is the voltage value at two ends of the xth light-emitting unit, and Rx is the equivalent resistance value of the first to the xth light-emitting unit connected in parallel, and x is a positive integer.

According to the above relationships, under an ideal condition, the voltage on all light-emitting unit 101 are the same and the current flowing through all light-emitting unit 101 are the same, so there is no problem of IR voltage drop.

However, under an actual condition, the first power line VDD and the second power line VSS in each light-emitting unit 101 have a line resistance M (the line resistance of the first power line VDD and the line resistance of the second power line VSS in each light-emitting unit 101 are the same). Therefore, a certain IR voltage drop will be generated, resulting in different voltages at two ends of the light-emitting units 101 when a current flows through the first power line VDD and the second power line VSS of each light-emitting unit 101. Namely, the first power line VDD and the second power line VSS generate a voltage drop due to the existence of the line resistance.

As shown in FIG. 3, the following relationships can be obtained:

V11'<V22'<V33'< . . . <Vxx'< . . . <V(n−2)(n−2)'<V(n−1)(n−1)'<Vnn';

i1<i2<i3< . . . <ix< . . . <i(n−2)<i(n−1)<in;

Therefore, the voltage actually applied at two ends of the light-emitting unit 101 and the current flowing through the light-emitting unit 101 increase accordingly as the number of stages increases. The light-emitting brightness of the light-emitting unit 101 is positively correlated with the current flowing through the light-emitting unit 101, and the existence of the IR voltage drop will eventually lead to uneven light-emitting brightness of the light-emitting panel 100.

Figure 4:
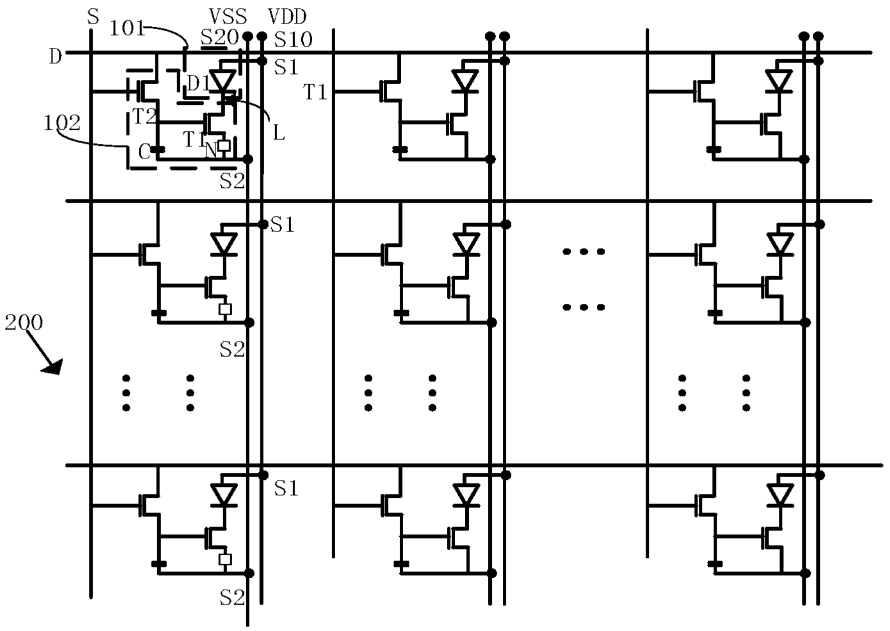
FIG. 4 is another structure diagram of a light-emitting panel provided by an embodiment of the application.
Figure 5:
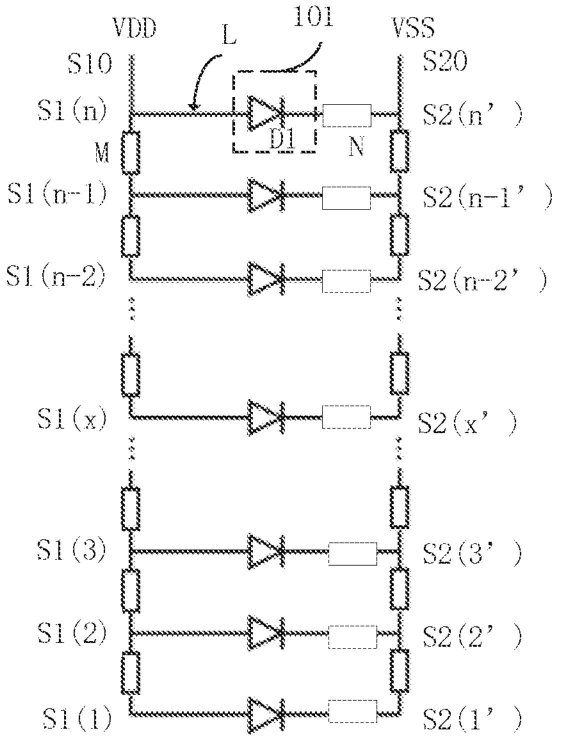
FIG. 5 is a schematic diagram of an equivalent circuit of a plurality of light-emitting units arranged at intervals along a first direction in the light-emitting panel shown in FIG. 4 under an actual condition.

Based on this, in the embodiment of the present application, a compensation resistor is connected to the light-emitting circuit in series to improve the uniformity of the light-emitting brightness of the light-emitting panel. Please refer to FIG. 4 and FIG. 5. FIG. 4 is another structure diagram of a light-emitting panel provided by an embodiment of the application. FIG. 5 is a schematic diagram of an equivalent circuit of a plurality of light-emitting units arranged at intervals along a first direction in the light-emitting panel shown in FIG. 4 under an actual condition. The difference between the light-emitting panel 200 shown in FIG. 4 and the light-emitting panel 100 shown in FIG. 1 is: a compensation resistor is connected to the light-emitting circuit L of the light-emitting panel 200 in series shown in FIG. 4 to improve the uniformity of the light-emitting brightness of the light-emitting panel 200.

Specifically, the light-emitting panel 200 provided by the embodiment of the present application includes a plurality of first power lines VDD, a plurality of second power lines VSS and a plurality of light-emitting units 101. The plurality of light-emitting units 101 are arranged in an array. Each column of light-emitting units 101 is correspondingly connected to a first power line VDD and a second power line VSS. The first power line VDD and the second power line VSS corresponding to each column of light-emitting units 101 are spaced apart. Each first power line VDD and each second power line VSS extend along a first direction.

Among the plurality of light-emitting units 101 arranged at intervals along the first direction, the plurality of light-emitting units 101 are connected to a plurality of light-emitting circuits L in series, and the light-emitting circuit includes the first power line VDD and the second power line VSS. A compensation resistor N is connected in the light-emitting circuit L in series to improve the uniformity of the light-emitting brightness of the light-emitting panel. One light-emitting unit 101 and one compensation resistor N are connected in the light-emitting circuit L in series. Namely, in the light-emitting circuit L connected with the compensation resistor N in series, the current driving the light-emitting unit 101 to emit light flows from the first power line VDD into the light-emitting unit 101 and flows out of the light-emitting unit 101 from the second power line VSS.

A first signal input terminal S10 is arranged on the first power line VDD. A second signal input terminal S20 is arranged on the second power line VSS. The first signal input terminal S10 and the second signal input terminal S20 are located on a same side. Specifically, in the embodiment of the present application, the light-emitting circuit L farthest from the first signal input terminal S10 or the second signal input terminal S20 is the first light-emitting circuit L, and so on, the light-emitting circuit L closest to the first signal input terminal S10 or the second signal input terminal S20 is the last light-emitting circuit L. The light-emitting unit 101 farthest from the first signal input terminal S10 or the second signal input terminal S20 is the first light-emitting unit 101, and so on, the light-emitting unit 101 closest to the first signal input terminal S10 or the second signal input terminal S20 is the last light-emitting unit 101.

A compensation resistor N is connected from the first light-emitting circuit L to the last light-emitting circuit L in series.

A plurality of first signal output terminals S1 are arranged on the first power line VDD. A plurality of second signal output terminals S2 are arranged on the second power line VSS. The plurality of first signal output terminals S1 and the plurality of second signal output terminals S2 are in one-to-one correspondence to form the plurality of light-emitting circuits L. The compensation resistor N is connected between the corresponding first signal output terminal S1 and the corresponding second signal output terminal S2 in series.

In some embodiment, the plurality of first signal output terminals S1 are arranged at equal intervals; namely, on the first power line VDD, the distances between adjacent first signal output terminals S1 are equal. The plurality of second signal output terminals S2 are arranged at equal intervals; namely, on the second power line VSS, the distances between adjacent second signal output terminals S2 are equal. The distance between adjacent first signal output terminals is equal to the distance between adjacent second signal output terminals. The light-emitting panel 200 provided by the embodiment of the present application can ensure the line resistance of the corresponding first power line VDD and the line resistance of the corresponding second power line VSS are equal in each light-emitting unit 101 through the aforesaid configuration, which is beneficial to improve the uniformity of the light-emitting brightness of the light-emitting panel 200.

In the embodiment of the present application, currents flowing through the light-emitting circuits L are equal, and voltages at two ends of the light-emitting devices D1 in the light-emitting circuits L are equal. Namely, currents flowing through the light-emitting units 101 are equal, and voltages at two ends of the light-emitting units 101 are equal.

As shown in FIG. 4 and FIG. 5, the plurality of light-emitting units 101 arranged at intervals along the first direction share one first power line VDD and one second power line VSS, and the current driving the light-emitting unit 101 to emit light flows from the first power line VDD into the light-emitting unit 101 and flows out of the light-emitting unit 101 from the second power line VSS. When the plurality of light-emitting units 101 in the first direction are in a light-emitting state, the switching transistor T2 is in the off state and the driving transistor T1 is in the on state, and one column of the light-emitting units 101 can be equivalent to a plurality of light-emitting units 101 connected in parallel with each other. One end of the parallel circuit is powered by the first power line VDD, and the other end of the parallel circuit is powered by the second power line VSS.

In order to realize that voltages at two ends of the light-emitting units 101 are equal and currents flowing through the light-emitting units 101 are equal, a compensation resistor N needs to be provided in the light-emitting circuit 101 to divide the voltage. The first light-emitting unit 101 does not need compensation. Therefore, the resistance value of the compensation resistor N provided in the first light-emitting circuit L is zero.

Under an actual condition, the first power line VDD and the second power line VSS have a line resistance. According to the series-parallel relationships of the circuit and the law of current and voltage, the following results can be calculated in turn:

$$i1 = i2 = i3 = \ldots = ix = \ldots = i(n-2) = i(n-1) = \text{in} = 1;$$

the first light-emitting unit: $i1 = i,\ l1 = i,\ R1 = r + r1 = r,$ $$V11' = R1 * l1 = r^{*}i,\ r1 = 0;$$

the second light-emitting unit: $i2 = i,\ l2 = i^{*}2 = 2i,$ $$R2 = (R1 + 2R)/2 = R + r/2,$$

$$V22' = R2^{*}l2 = (R + r/2)^{*}2i = (r + r2)^{*}i,\ R2 = 2R;$$

the third light-emitting unit: $i3 = i,\ l3 = i^{*}3 = 3i,$ $$R3 = (R2 + 2R)/2 = 2R + r/3,$$

$$V33' = R3^{*}l3 = (2R + r/3)^{*}3i = (r + r3)^{*}i,\ r3 = 6R;$$

the fourth light-emitting unit: $i4 = i,\ l4 = i^{*}3 = 4i,$ $$R4 = (R3 + 2R)/2 = 3R + r/4,$$

$$V44' = R4^{*}l4 = (3R + r/4)^{*}4i = (r + r4)^{*}i,\ r4 = 12R;$$

...

the $xth$ light-emitting unit: $ix = i,\ lx = i * x = xi,$ $$Rx = (Rx - 1 + 2R)/2 = (x-1)R + r/x,$$

$$Vxx' = Rx^{*}lx = [(x-1)^{*}R + r/x]^{*}xi = (r + rx)^{*}i,\ rx = (x-1)^{*}x^{*}R;$$

...

the $nth$ light-emitting unit: $in = i,\ ln = i^{*}n = ni,$ $$Rn = (Rn - 1 + 2R)/2 = (n-1)R + r/n,$$

$$Vnn' = Rn^{*}ln = [(n-1)^{*}R + r/n]^{*}ni = (r + rn)^{*}i,\ rn = (n-1)^{*}n^{*}R;$$

wherein the light-emitting unit 101 is a constant current device. In order to make the light-emitting unit 101 emit light with a fixed brightness, the current value flowing through the light-emitting unit 101 is required to be fixed to i; that is, i is the current value flowing through each light-emitting circuit L. r is the resistance value of the fixed resistance device equivalent to each light-emitting unit 101. ix is the current value flowing through the xth light-emitting unit, and lx is the sum of the current values flowing through the first to the xth light-emitting units, and Vxx' is the voltage value at two ends of the xth light-emitting unit, and Rx is the equivalent resistance value of the first to the xth light-emitting unit connected in parallel, and rx is the resistance value of the compensation resistor N connected in the xth light-emitting circuit L in series, and R is the resistance value of the line resistance M of the first power line VDD or the second power line VSS in each light-emitting unit 101.

According to the foregoing calculation results, except for the first light-emitting circuit L, the other light-emitting circuits L are connected with a compensation resistor N (the value of the compensation resistor N connected in the xth stage light-emitting circuit L is (x−1)*x*R) in series. It can be realized that the voltages applied at two ends of the light-emitting devices D1 and the currents flowing through the light-emitting units 101 in all light-emitting circuits L are exactly the same, thereby completely eliminating the IR voltage drop and making the light-emitting brightness uniform.

Meanwhile, according to the foregoing calculation results, it is possible to calculate that the total power consumption P of one column of light-emitting units 101, and the valid power consumption P of one column of light-emitting units 101 is valid, and the invalid power consumption P on the line loading resistance is invalid, and the ratio of invalid power consumption to valid power consumption P is Pinvalid/Pvalid. The ratio of Pinvalid/Pvalid represents the increase in the invalid power consumption caused by the line resistance of the first power line VDD, the line resistance of the second power line VSS and the compensation resistor N. The specific results are as follows:

P=Rn*In*In=[(n−1)*R+r/n]*ni*ni=(n−1)*n2*R*i2+n*r*i2;

Pvalid=n*r*i2;

Pinvalid=P−Pvalid=(n−1)*n2*R*i2;

Pinvalid/Pvalid=[(n−1)*n2*R*i2]/(n*r*i2)=(n−1)*n*R/r.

Figure 6:
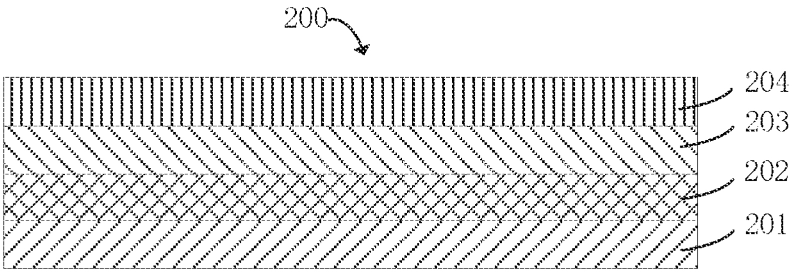
FIG. 6 is a cross-sectional structure diagram of a light-emitting panel provided by an embodiment of the present application.

Furthermore, referring to FIG. 6, FIG. 6 is a cross-sectional structure diagram of a light-emitting panel provided by an embodiment of the present application. As shown in FIG. 6, the light-emitting panel 200 in the embodiment of the present application includes a substrate 201, and a first metal layer 202 and a second metal layer 204 disposed on the substrate 201. An insulating layer 203 is further provided between the first metal layer 202 and the second metal layer 204.

In one embodiment, the first metal layer 202 includes the compensation resistor N. In another embodiment, the second metal layer 204 includes the compensation resistor N. In another embodiment, the first metal layer 202 and the second metal layer 204 are arranged to be connected in series to form the compensation resistor N. In another embodiment, the first metal layer 202 and the second metal layer 204 are arranged to be connected in parallel to form the compensation resistor N. Namely, in the embodiment of the present application, the compensation resistor N is formed by the first metal layer 202 and/or the second metal layer 204 in the light-emitting panel 200 instead of directly setting a resistance device.

Figure 7:
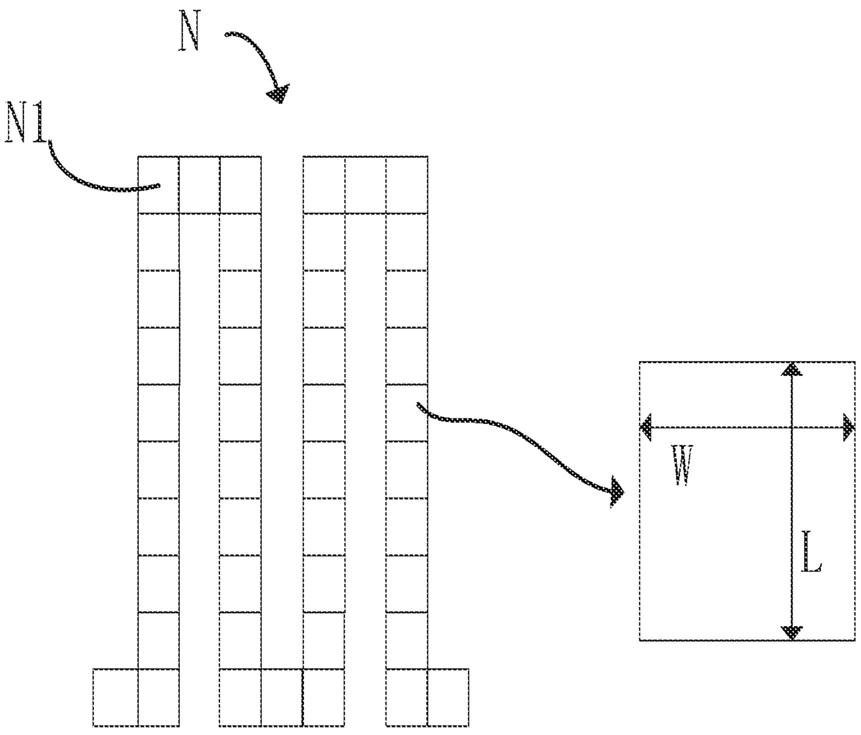
FIG. 7 is a structural diagram of a compensation resistor in a light-emitting panel provided by an embodiment of the present application.

Furthermore, referring to FIG. 7, FIG. 7 is a structural diagram of a compensation resistor in a light-emitting panel provided by an embodiment of the present application. As shown in FIG. 7, the compensation resistor N includes a plurality of electrically connected metal block units N1, and a resistance value of each of the metal block units N1 is derived according to the following formula: R0=Rs*L/W, wherein R0 is a resistance value of the metal block unit, and Rs is a square resistance of the corresponding metal layer, and L is a length of the metal block unit, and W is a width of the metal block unit. The required compensation resistance N can be obtained by connecting several metal block units N1 in series. As designing the compensation resistor N, it is necessary to comprehensively consider the material, thickness, series-parallel mode of the metal layers, and the width W and length L of the metal block unit N1, so as to design the compensation resistor N while meeting the current withstand requirements of the lines.

In the light-emitting panel 200 provided by the embodiment of the present application, the plurality of light-emitting units 101 are connected to the plurality of light-emitting circuits L in series in one-to-one correspondence, and the light-emitting circuit includes the first power line VDD and the second power line VSS. A compensation resistor N is connected in the light-emitting circuit L in series to improve the uniformity of the light-emitting brightness of the light-emitting panel 200.

The light-emitting panels provided by the embodiments of the present application are described in detail as aforementioned, and the principles and implementations of the present application have been described with reference to specific illustrations. The description of the foregoing embodiments is merely for helping to understand the technical solutions of the present application and the core ideas thereof; meanwhile, those skilled in the art will be able to change the specific embodiments and the scope of the application according to the idea of the present application. In conclusion, the content of the specification should not be construed as limiting the present application.

What is claimed is:

1. A light-emitting panel, comprising:

a first power line;

a second power line, the second power line and the first power line are spaced apart; and a plurality of light-emitting units, the plurality of light-emitting units are connected to a plurality of light-emitting circuits in series in one-to-one correspondence, and the light-emitting circuit comprises the first power line and the second power line, wherein a compensation resistor is connected to the light-emitting circuit in series;

wherein a plurality of first signal output terminals are arranged on the first power line, and a plurality of second signal output terminals are arranged on the second power line;

the plurality of first signal output terminals and the plurality of second signal output terminals are in one-to-one correspondence to form the plurality of light-emitting circuits, and the compensation resistor is connected between the corresponding first signal output terminal and the corresponding second signal output terminal in series; and wherein the plurality of the first signal output terminals are equally spaced, and the plurality of the second signal output terminals are equally spaced, and a distance between adjacent first signal output terminals is equal to a distance between adjacent second signal output terminals.

2. The light-emitting panel according to claim 1, wherein a first signal input terminal is arranged on the first power line, and a second signal input terminal is arranged on the second power line, and the first signal input terminal and the second signal input terminal are located on a same side.

3. The light-emitting panel according to claim 2, wherein currents flowing through each of the light-emitting circuits are equal, and voltages at two ends of light-emitting devices in the light-emitting circuits are equal.

4. The light-emitting panel according to claim 3, wherein a voltage Vxx' at the two ends of the xth light-emitting circuit is equal to (r+rx)*i, wherein rx is a resistance value of the compensation resistor connected in the xth light-emitting circuit in series, and r is a resistance value of an equivalent resistance of the light-emitting device in each of the light-emitting units, and i is a current value flowing through each of the light-emitting circuits, and x is a positive integer.

5. The light-emitting panel according to claim 4, wherein the resistance value rx of the compensation resistor connected in the xth light-emitting circuit in series is equal to (x−1)*x*R, wherein R is a resistance value of a line resistance of the first power line or the second power line in each of the light-emitting units.

6. The light-emitting panel according to claim 5, wherein an equation for an increase in an invalid power consumption caused by the line resistance of the first power line, the line resistance of the second power line and the compensation resistor is Pinvalid/Pvalid=(n−1)*n*R/r, wherein n is a number of the plurality of light-emitting units arranged at intervals along a first direction.

7. The light-emitting panel according to claim 1, wherein the light-emitting panel comprises a substrate, and a first metal layer and a second metal layer disposed on the substrate;

wherein the first metal layer comprises the compensation resistor, or the second metal layer comprises the compensation resistor, or the first metal layer and the second metal layer are arranged to be connected in series to form the compensation resistor, or the first metal layer and the second metal layer are arranged to be connected in parallel to form the compensation resistor.

8. The light-emitting panel according to claim 1, wherein the compensation resistor comprises a plurality of electrically connected metal block units, and a resistance value R0 of each of the metal block units is equal to Rs*L/W, wherein R0 is the resistance value of the metal block unit, and Rs is a square resistance of a corresponding metal layer, and L is a length of the metal block unit, and W is a width of the metal block unit.

9. A light-emitting panel, comprising:

a first power line;

a second power line, the second power line and the first power line are spaced apart; and a plurality of light-emitting units, the plurality of light-emitting units are connected to a plurality of light-emitting circuits in series in one-to-one correspondence, and the light-emitting circuit comprises the first power line and the second power line, wherein a compensation resistor is connected to the light-emitting circuit in series;

a plurality of first signal output terminals are arranged on the first power line, and a plurality of second signal output terminals are arranged on the second power line;

the plurality of first signal output terminals and the plurality of second signal output terminals are in one-to-one correspondence to form the plurality of light-emitting circuits, and the compensation resistor is connected between the corresponding first signal output terminal and the corresponding second signal output terminal in series;

a first signal input terminal is arranged on the first power line, and a second signal input terminal is arranged on the second power line, and the first signal input terminal and the second signal input terminal are located on a same side;

wherein the plurality of the first signal output terminals are equally spaced, and the plurality of the second signal output terminals are equally spaced, and a distance between adjacent first signal output terminals is equal to a distance between adjacent second signal output terminals.

10. The light-emitting panel according to claim 9, wherein currents flowing through each of the light-emitting circuits are equal, and voltages at two ends of light-emitting devices in the light-emitting circuits are equal.

11. The light-emitting panel according to claim 10, wherein a voltage Vxx' at the two ends of the xth light-emitting circuit is equal to (r+rx)*i, wherein rx is a resistance value of the compensation resistor connected in the xth light-emitting circuit in series, and r is a resistance value of an equivalent resistance of the light-emitting device in each of the light-emitting units, and i is a current value flowing through each of the light-emitting circuits, and x is a positive integer.

12. The light-emitting panel according to claim 11, wherein the resistance value rx of the compensation resistor connected in the xth light-emitting circuit in series is equal to (x−1)*x*R, wherein R is a resistance value of a line resistance of the first power line or the second power line in each of the light-emitting units.

13. The light-emitting panel according to claim 12, wherein an equation for an increase in an invalid power consumption caused by the line resistance of the first power line, the line resistance of the second power line and the compensation resistor is Pinvalid/Pvalid=(n−1)*n*R/r, wherein n is a number of the plurality of light-emitting units arranged at intervals along a first direction.

14. The light-emitting panel according to claim 9, wherein the light-emitting panel comprises a substrate, and a first metal layer and a second metal layer disposed on the substrate;

wherein the first metal layer comprises the compensation resistor, or the second metal layer comprises the compensation resistor, or the first metal layer and the second metal layer are arranged to be connected in series to form the compensation resistor, or the first metal layer and the second metal layer are arranged to be connected in parallel to form the compensation resistor.

15. The light-emitting panel according to claim 9, wherein the compensation resistor comprises a plurality of electrically connected metal block units, and a resistance value R0 of each of the metal block units is equal to Rs*L/W, wherein R0 is the resistance value of the metal block unit, and Rs is a square resistance of a corresponding metal layer, and L is a length of the metal block unit, and W is a width of the metal block unit.

16. The light-emitting panel according to claim 15, wherein a plurality of first signal output terminals are arranged on the first power line, and a plurality of second signal output terminals are arranged on the second power line;

the plurality of first signal output terminals and the plurality of second signal output terminals are in one-to-one correspondence to form the plurality of light-emitting circuits, and the compensation resistor is connected between the corresponding first signal output terminal and the corresponding second signal output terminal in series.

* * * * *